(12) United States Patent
Pariseau

(10) Patent No.: US 10,810,869 B2
(45) Date of Patent: Oct. 20, 2020

(54) CROWDSOURCED AIR QUALITY MONITORING SYSTEM

(71) Applicant: Particles Plus, Inc., Canton, MA (US)

(72) Inventor: David Pariseau, Los Altos, CA (US)

(73) Assignee: Particles Plus, Inc., Canton, MA (US)

( * ) Notice: Subject to any disclaimer, the term of this patent is extended or adjusted under 35 U.S.C. 154(b) by 0 days.

(21) Appl. No.: 15/442,611

(22) Filed: Feb. 24, 2017

(65) Prior Publication Data

US 2018/0247526 A1 Aug. 30, 2018

(51) Int. Cl.
| | |
|---|---|
| *H04L 29/08* | (2006.01) |
| *H04Q 9/00* | (2006.01) |
| *H04W 4/02* | (2018.01) |
| *H04W 4/38* | (2018.01) |
| *G08C 25/04* | (2006.01) |
| *H04L 29/06* | (2006.01) |

(52) U.S. Cl.
CPC ............ *G08C 25/04* (2013.01); *H04L 67/025* (2013.01); *H04L 67/18* (2013.01); *H04Q 9/00* (2013.01); *H04W 4/02* (2013.01); *H04L 67/12* (2013.01); *H04L 67/42* (2013.01); *H04Q 2209/40* (2013.01); *H04W 4/38* (2018.02)

(58) Field of Classification Search
CPC .......... F24F 11/0017; F24F 2011/0019; F24F 2011/0021; F24F 2011/0023; F24F 2011/0027; F24F 2011/003; G01F 15/063; G01N 1/2273; G01N 33/00; G01N 33/0031; G01N 33/0034; G01N 33/0075; G01N 2001/021; G01N 2001/2276; G08B 21/12; G08B 21/14; G08B 21/16; G08C 25/04; G08C 2200/00; H04L 67/025; H04L 67/12; H04Q 9/00; H04W 4/006; H04W 4/02; H04W 4/021

USPC ................ 73/31.01, 31.02, 863.31; 340/627, 340/870.06

See application file for complete search history.

(56) References Cited

U.S. PATENT DOCUMENTS

| | | | |
|---|---|---|---|
| 8,762,060 B2 * | 6/2014 | Chainer | G01V 3/00 |
| | | | 702/2 |
| 9,140,638 B2 | 9/2015 | Pariseau et al. | |
| 9,140,639 B2 | 9/2015 | Pariseau | |
| 9,141,094 B2 | 9/2015 | Pariseau et al. | |
| 9,157,847 B2 | 10/2015 | Pariseau et al. | |
| 9,158,652 B2 | 10/2015 | Pariseau | |
| 9,216,509 B2 * | 12/2015 | Renkis | G08B 13/00 |

(Continued)

FOREIGN PATENT DOCUMENTS

| | | |
|---|---|---|
| CN | 104535465 A | 4/2015 |
| WO | 2015/160830 A1 | 10/2015 |
| WO | 2017/064376 A1 | 4/2017 |

OTHER PUBLICATIONS

Wikipedia, Entry for "Peer-to-peer", as of Dec. 28, 2016, 9 pages.*

*Primary Examiner* — Stephen R Burgdorf
(74) *Attorney, Agent, or Firm* — McCarter & English, LLP; Thomas O. Hoover; Coalton Bennett

(57) ABSTRACT

A crowdsourced air quality monitoring system. Such a system could provide information beyond the user's local instrument on air quality over a much larger area. This information could be used by a user to make decisions about frequenting particular areas based on the results, or to alert them to changing conditions in the area so that the user might act before local conditions change.

20 Claims, 5 Drawing Sheets

(56) References Cited

U.S. PATENT DOCUMENTS

| | | | |
|---|---|---|---|
| 9,424,598 B1* | 8/2016 | Kraft | G06Q 30/0627 |
| 9,677,990 B2 | 6/2017 | Pariseau et al. | |
| 10,292,055 B2* | 5/2019 | Carpenter | G08G 1/205 |
| 2002/0144537 A1* | 10/2002 | Sharp | G01N 33/0034 |
| | | | 73/31.01 |
| 2003/0051023 A1* | 3/2003 | Reichel | G01N 33/0075 |
| | | | 709/223 |
| 2006/0027677 A1* | 2/2006 | Abts | A01G 25/092 |
| | | | 239/67 |
| 2008/0200181 A1* | 8/2008 | Zill | G01S 5/02 |
| | | | 455/456.1 |
| 2010/0030382 A1* | 2/2010 | Shalat | B25J 13/087 |
| | | | 700/258 |
| 2010/0160744 A1* | 6/2010 | Ha | H04W 4/02 |
| | | | 600/301 |
| 2010/0303339 A1* | 12/2010 | Caduff | G06F 3/011 |
| | | | 382/154 |
| 2011/0294517 A1* | 12/2011 | Hahm | G01C 17/28 |
| | | | 455/456.1 |
| 2013/0038470 A1* | 2/2013 | Niemeyer | H04Q 9/00 |
| | | | 340/870.11 |
| 2013/0086615 A1* | 4/2013 | Williams | H04N 21/41407 |
| | | | 725/62 |
| 2014/0309782 A1* | 10/2014 | Sharpe | G05D 21/02 |
| | | | 700/266 |
| 2015/0212057 A1 | 7/2015 | Darveau | |
| 2016/0014566 A1* | 1/2016 | Bengtsson | H04W 4/026 |
| | | | 455/456.1 |
| 2016/0153884 A1* | 6/2016 | Han | G01N 1/2205 |
| | | | 73/1.06 |
| 2017/0315103 A1* | 11/2017 | Biswas | G01N 33/0004 |
| 2018/0010935 A1* | 1/2018 | Arnott | G01D 18/008 |
| 2018/0082566 A1 | 3/2018 | Semanoukian et al. | |
| 2018/0299418 A1* | 10/2018 | Poincelet | G01N 33/0032 |

\* cited by examiner

AirQuality Instrument Type
- Sensor Id#
- Sensor Name
- List of integrated sensors
- List of installed sensors
- Details on each sensor
 - Sample rate
 - Sample volume
 - Parameter type
 - Parameter accuracy
 - Paramter resolution
 - Parameter range
 - Temperature range

401

Sample air quality data record 411

| Air quality instrument | Attached sensor List | Annotation |
|---|---|---|
| - AQ Instrument type<br>- Unique Id#<br>- Current Date/time<br>- Current Position  412 | - Sensor Type<br>- Sensor Status<br>- Sensor Data<br>413 | - Text notation<br>- Special Tag<br>- Media notation<br>414 |

Figure 4

CROWDSOURCED AIR QUALITY MONITORING SYSTEM

FIELD OF THE INVENTION

The present invention is related to instruments within systems and, more specifically to aft quality monitoring instruments within systems.

BACKGROUND OF THE INVENTION

With the increase in miniaturization, portable and wearable electronic products are a growing trend. As such, sophisticated aft quality monitoring instruments are increasingly within reach of individual users. Such instruments, however, have a limited range and can only measure conditions in the immediate vicinity of the instrument. Air quality is of increasing concern for individuals. Numerous studies have been published linking air quality with short and long term health problems. For example: The World Health Organization WHO estimates that some 80% of outdoor aft pollution-related premature deaths were due to ischaemic heart disease and strokes, while 14% of deaths were due to chronic obstructive pulmonary disease or acute lower respiratory infections; and 6% of deaths were due to lung cancer.

Ambient outdoor air pollution in both cities and rural areas was estimated to cause 37 million premature deaths worldwide per year in 2012; this mortality is due to exposure to small particulate matter of 10 microns or less in diameter $PM_{10}$, which cause cardiovascular and respiratory disease, and cancers.

The 2005 "WHO Air quality guidelines" offer global guidance on thresholds and limits for key aft pollutants that pose health risks. The Guidelines indicate that by reducing particulate matter $PM_{10}$ pollution from 70 to 20 micrograms per cubic meter µg/m3, we can cut air pollution-related deaths by around 15%.

The Guidelines apply worldwide and are based on expert evaluation of current scientific evidence for:

particulate matter (PM)
ozone ($O_3$)
nitrogen dioxide ($NO_2$); and
sulfur dioxide ($SO_2$), in all WHO regions.

In addition to the above, a number of other parameters affecting health are also cited by other sources like the Centers for Disease Control CDC. These include Carbon Monoxide, Lead, Nitrogen Oxide, Acrolein, Asbestos, Benzene, Carbon Disulfide, Creosote, Fuel oils like Kerosene, Polycyclic Aromatic Hydrocarbons, Synthetic Vireous Fibers, Total Petroleum Hydrocarbons. Various other volatile organic compounds like Formaldehyde are also of interest since products manufactured with these are present in some countries. Therefore, what is needed is system that monitors aft quality in a given geographical area and provides information about air quality for the given geographical area to a user.

SUMMARY

A crowdsourced aft quality monitoring system is disclosed in accordance with the various aspects and embodiments of the invention. The system monitors aft quality in a given geographical area and provides information about the air quality for the given geographical area to a user. The system includes at least one aft quality monitoring instrument and a server that is communication with the instrument. The instrument Includes at least one aft quality sensor and connects to the server through a network. The system monitors aft quality and aft quality information, including at least one of a current date, a time, and a position, is communicated from the instrument through the network to the server.

BRIEF DESCRIPTION OF THE DRAWINGS

The foregoing summary as well as the following detailed description is better understood when read in conjunction with the appended drawings. For the purpose of illustrating the invention, there is shown in the drawings exemplary embodiments in accordance with various aspects of the invention. However, the invention is not limited to the specific embodiments and methods disclosed. In the drawings:

FIG. 4 shows a table that includes an example of a configuration structure that might be used to describe an air quality instrument.

DETAILED DESCRIPTION

Figure 1:
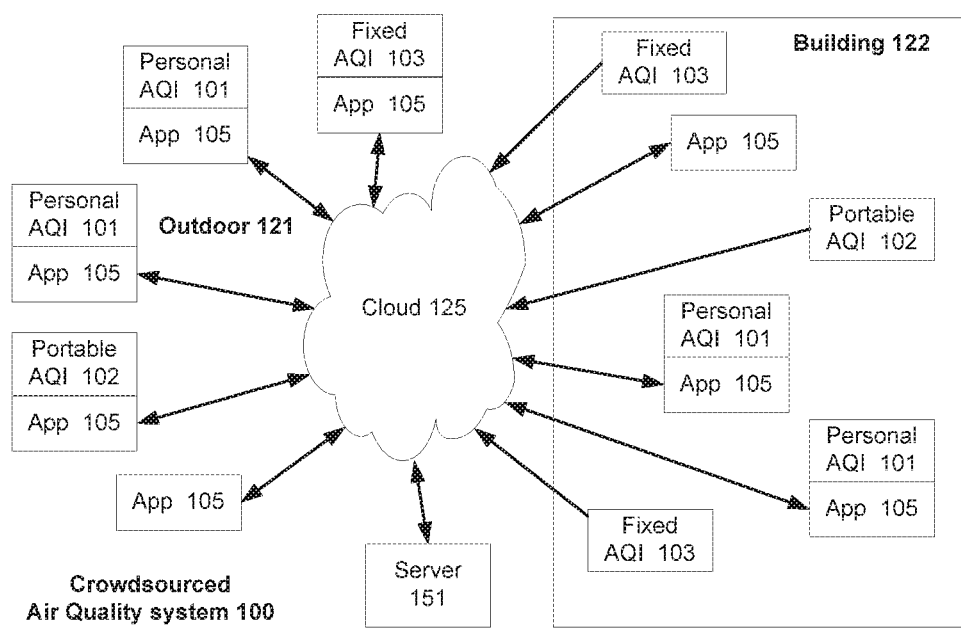
FIG. 1 is a crowdsourced air quality system in accordance with the various aspects and embodiment of the invention.

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the FIGS., in which like numbers represent the same or similar elements. Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

Where a range of values is provided, it is understood that each intervening value, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the thing date and should not be construed as an admission that the invention is not entitled to antedate such publication by virtue of prior invention. Further, the dates of publication provided may be different from the actual publication dates, which may need to be independently confirmed.

There is a distinction between the types of factors one is most concerned with for indoor air quality vs. outdoor aft quality monitoring, for example for indoor aft quality CO2 is of larger concern though CO2 is seldom an issue in outdoor air quality. Aft quality monitoring instruments measure various parameters in proximity to the instrument. These parameters might include, but are not limited to particulates and/or various gases to create a picture of the local environment. In order to map out a larger area like a building for indoor aft quality, or a city for outdoor aft quality current systems if they exist rely on networks of fixed instruments. One or more computers collect the data from these instruments in order to determine the conditions in proximity to each and then attempt to represent the area from these. As noted, these systems are largely comprised of fixed systems and typically purchased and deployed by the system administrator.

An emerging class of applications are using crowdsourcing to collect and aggregate data. This has become popular for traffic reporting. Systems like Wane and others collect GPS and other data like notes or observations from individual users and then aggregate this data to provide a detailed view over a larger geographic area than any individual could otherwise construct. Also, these sensors are owned by the individuals not the system.

With the advent of the Internet-of-things (IOT) aggregating data from disparate sensors and making processed results available to end-users is a growing trend. This is facilitating the creation of the required infrastructure in order to make such an application possible. Prior to the existence of ubiquitous high-speed networks with low-cost chipsets and servers to process these creating such a system would have been a daunting prospect, and wouldn't have made practical sense.

Accordingly, a system of air quality instruments which are aggregated using crowdsourcing to produce an aggregate picture of aft quality for use for indoor and/or outdoor aft quality monitoring/reporting. Referring now to FIG. 1, a crowdsourced aft quality system 100 is shown in accordance with the various aspects and embodiments of the invention.

FIG. 1 shows a hybrid system showing instruments and users in both an outdoor environment 121 and indoor environment, for example within a building 122. It also shows a mixture of aft quality instruments, such as: Personal instruments 101, Portable instruments 102 and Fixed aft quality instruments (AQI) 103. Each instrument 101-103 might measure one or more aft quality parameters which might include, but is not limited to: particulates, Temperature, Relative Humidity, CO2, CO, NO, NO2, SO2, O3, aggregate or specific VOCs. They would report this information along with current sensor date/time and current sensor position information to at least one server in a network. The data would be aggregated by the Server 151. The aggregated data would be available to applications (App) 105 allowing them to represent current or historical aggregated views of the system's geographical area.

The data could be sent by some instruments through the cloud directly by the Server 151 without requiring an application. For example, aft quality instruments 102-103, which are shown connected directly to the Cloud 125 without an application 105, show arrows in a single direction, indicating traffic moving to the Server 151 without receiving aggregate information. This would be the case in the case of instruments that don't have a user interface and instead merely collect and report data.

The Cloud 125 indicates at least one network linking the various components in a system. This network is a logical construct and might well be composed of various distributed networks running various protocols over different physical layers. An obvious representation of such a network would be the internet.

The aft quality, date/time and position information sent from all the aft quality instruments 101-103, through the Cloud 125 would be collected by one or more Servers 151 and aggregated to create an aggregate data set of the various aft quality parameters across a geographic area. One or more servers 151 would make that aggregated data available to applications 105. These applications 105 could run on separate devices like personal computers, tablets, smart phones, etc. or within the aft quality instruments themselves 101-103.

Figure 2:
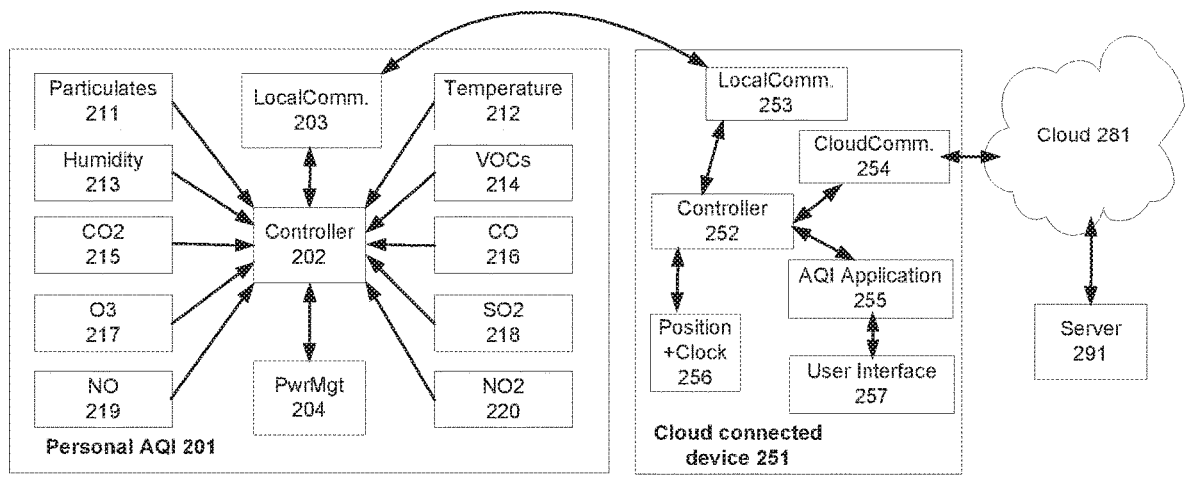
FIG. 2 is an implementation with a personal air quality instrument system in accordance with the various aspects and embodiment of the invention.

FIG. 2 shows an implementation with a personal air quality instrument 201 which comprises a number of air quality sensors 211-220, a local controller 202, power management circuitry 204 and a local communications controller 203. This instance happens to contain sensors 211-220, but other implementations might only have a subset of these or might incorporate other air quality sensors not shown. The intention is not to stipulate a specific sensor technology, for example the particulate sensor might be implemented as an optical particle counter OPC or it might be a photometer, or be based on some other technology. The various aspects and embodiment of the invention is directed at the overall system implementation and not limited by the details of the integration of the individual sensors that can be used in the implementation of the system.

The arrows in the diagram show information or signals moving from the various sensors to the local controller 202, but this is merely to indicate the direction of the air quality information. There may well be bidirectional communication to these sensors in order to calibrate, configure, monitor or operate them. The local controller 202 collects air quality data from the sensors 211-220 and might condition, filter, linearize, offset and/or scale the data in order to provide information with standard units, or it might merely send raw data on for processing elsewhere in the system.

The power management circuitry 204 implements these features in the system, it might include voltage regulators, voltage references, current sources for some of the sensors battery management and/or charging, etc. The local communications controller 203 implements a local communication link, for example Bluetooth, or Zigbee, etc. to a Cloud Connected Device 251. If the Local communications controller 203 has enough onboard resources it might even also be the local controller 202 for the instrument. The bidirectional interface between the Personal AQI 201 and the Cloud Connected device 251 is concerned with gathering air quality information from the device as well as any status or error conditions, although the Cloud Connected Device 251 might also control the operation of the aft quality instrument 201, perhaps to switch between sleep/active modes or performing diagnostics or calibration.

Some implementations of the invention might merge the Personal AQI portion 201 with the Cloud connected device portion 251 to create a single integrated device. Such an implementation wouldn't require, though it might still contain, either Local Communications controller 203, 253.

The Cloud Connected Device 251 would typically be an off-the-shelf though it could be custom device like a srnartphone, a tablet, or a laptop, etc. An application 255 running either locally on the Controller 252 or partially from the web, in the case of a web-based application would gather aft quality and status information from the AQI 201 as well as position and date/time information from the position/clock sensor 256 on the Cloud Connected device 251 and would send this information using the Cloud Communications Controller 254 through the Cloud 281 to Server 291. The application 255 would also receive aggregated data or visual representations of the data like maps over the same link and could display such with its local data on its user interface 257. The Cloud 281 could be any network, wireless or wired, and the Server 291 any type of computer or instrument that could be used to collect and store the incoming data, and serve aggregate data back to the client applications 255.

The user interface 257 might take several forms, in addition to a traditional display with a touchscreen, it might well involve simple SMS type messages to a phone to indicate air quality status either locally or in the geographic environment, or it might simply involve beeping or vibrating. Some Cloud Connected devices 251 might not have any user interface at all, and could merely be reporting aft quality, status, date; tune, and position information without requesting any aggregate data or results.

One particular case of the above might involve a sensor network which might be deployed in an area, perhaps as part of a response to some environmental event. For example, in the aftermath of some event sensors could be supplied to first responders, these would likely have associated displays as previously discussed. But, there might also be additional sensors attached to drones or even small robots moving through the area. In these cases, aggregate map information is not required by these devices, so the information flow for these instruments would be largely unidirectional with these instruments reporting theft aft quality, status, date/time, and position information, but having no need to receive aggregate data or results.

To further increase the sensor density a sensor network could be deployed. Simple air quality sensors in an area might all be connected to a local sensor network which in turn might be connected to the cloud. In such a system, the sensors themselves might only have simple local communications capabilities and lack accurate position information. In such cases the position of the Cloud Connected device 251 could be used to provide a proxy location for the various sensors in the local sensor network and this data for these sensors could be listed or averaged, or perhaps shown with both average and standard deviation.

Another alternative would be to derive the individual sensor locations from the sensor network and have a local controller fill in the derived position and attach it with the current date/time to the aft quality information before forwarding that on to the Server. This would avow each individual sensor to be much lower-cost, and hence allow for the deployment of larger number of these.

Figure 3:
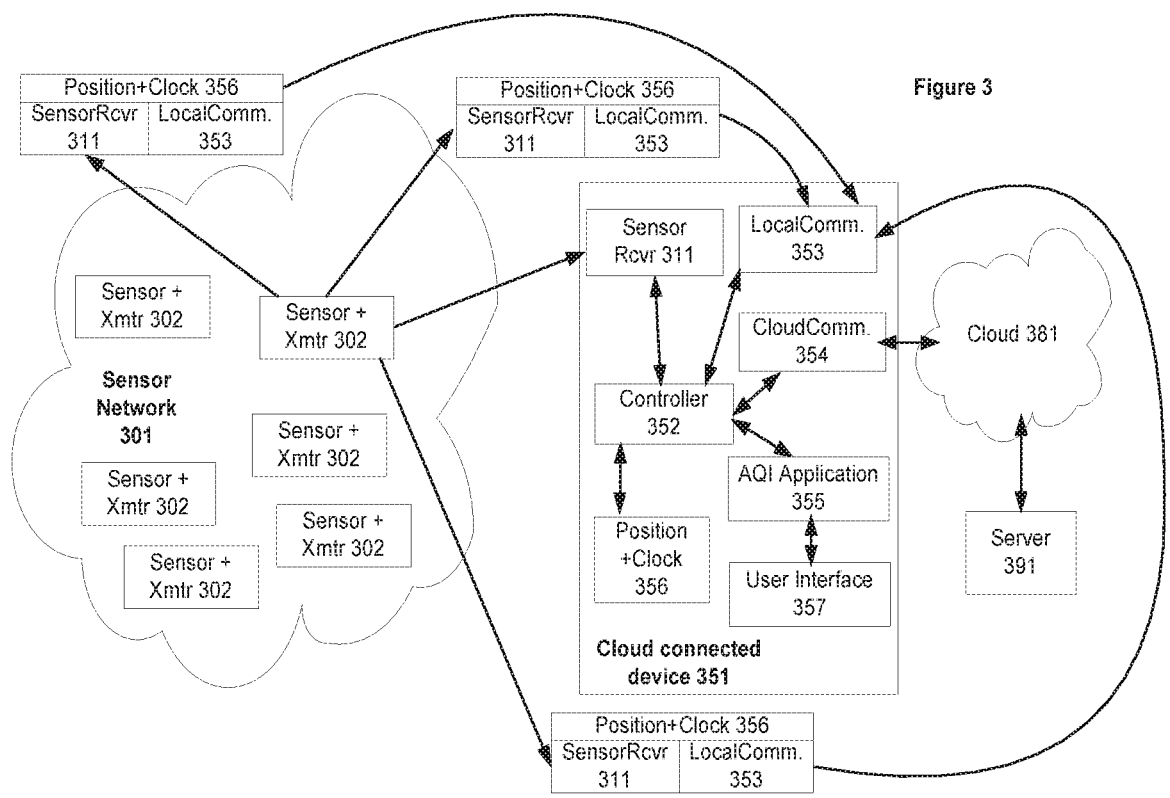
FIG. 3 shows a network of air quality sensors in accordance with the various aspects and embodiment of the invention.

Referring now to FIG. 3, such a network is shown. A number of aft quality sensors 302 would be released and move about the environment or be strewn throughout the environment perhaps dropped by air using a drone. These sensors 302 would have one or more onboard aft quality sensors and at least one short-range communications transmitter though they might also have receivers, discussed later. These sensors 302 would comprise a sensor network 301. Each sensor 302 would periodically report air quality information from theft sensors using theft integrated transmitters.

A small number of Sensor Receivers 311, with precise clocks and position sensors 356 would timestamp these received messages and communicate such within a local network using theft integrated local communications controllers 353. From this information, a local controller, in this case the Cloud Connected device 351, could determine the position of the sensors and attach that position information along with the current date/time to the aft quality information received from the Sensor 302. The position information would be determined by triangulation with 3 Sensor Receivers 311 providing enough information to determine relative position in 2 dimensions, and 4 Sensor Receivers 311 providing enough information to determine relative position in 4 dimensions for example, like GPS. Since each Sensor Receiver 311 would also have accurate position information due to theft local position sensor 356 the relative position of the sensors could be converted to an absolute position.

Once position information is derived, that information can be attached to the sensor air quality information and then communicated via a Cloud connected device 351 via its Cloud Communications controller 354 through a network cloud 381 to at least one Server 391. This would allow for a large number of low-cost air quality sensors 302 to be deployed with a minimum of electronics.

The arrows from the sensor nodes 302 and from the Local Communications controllers 353 are drawn as unidirectional to show the main direction of the sensor information. However, all devices 302 and 311 on the sensor network could have both transmitters and receivers to enable bidirectional communications. This might allow for calibration and configuration information to flow. It would also allow the system to provide direction information to the various sensors 302 in order to more evenly deploy or direct them perhaps redeploying them based on changing conditions within an environment and also keep them within the desired area.

A key differentiator of this invention is that the air quality information is closely coupled with current date, time, and position information for that instrument. The position information is deemed to be dynamic and is recorded if not with every record then at a sufficient rate to record changes in position. This information is used to create a dynamic aggregate map of air quality conditions across a geographic area. And, though in some cases, gross location information is included in some monitoring systems, it is not intended as geographic coordinates but rather as informational location markers like "Gowning Room Vent" or "Lithography door" or "Room 103 doorway" and such are typically stationary designators even if the instrument is sometimes moved and the location changed manually by a user.

In the case of fixed instruments our position information might be static, but it would still be communicated at least periodically with the air quality information. The position data might be sourced directly from a GPS receiver, but it might also be derived from a street address perhaps on installation and then communicated thereafter as the same derived position information. The system might have a field to indicate that this is a fixed location.

In addition to position information, one or more annotation fields night also be included with the data. These fields might be used to provide additional location or status information to the air quality records. For example, an annotation field might be used to provide additional location information like "Starbucks" so that if annotations were included on a map the user would see then enhanced location information, in this way, a merchant had installed filtration equipment and was touting enhanced aft quality might note the name of theft establishment on a map.

Annotations might also enable users to add observations to the data attempting in order to provide context to the reported values. For example, a user night note that "Burning leaves" to provide some explanation for the increased particulate counts in a neighborhood. "Vehicle on fire on shoulder" might be provide context for elevated particulates on a stretch of freeway. Applications like Waze allow users to make comments about traffic issues they witness which provides context for users of the system in understanding the underlying causes of issues in the traffic and gauge how this might impact the data over time. So, similarly allowing users to make comments about leaf-blowers, pressure washers, dirty truck exhaust, traffic jams, etc. when aft quality is compromised might add context to the raw information.

Since annotations are sent along with the normal data stream the current location is included they could be associated with a location where they were made as in the above examples. However, they could also be associated with a particular air quality instrument, and as such might include a particular identifier for each. This might be useful to track particular first responders within an environment by assigning each a tag and annotating t such that annotation is not persistent and is updated on the next sample from that instrument, as such the tag would then move with the aft quality instrument, and be fixed at their last known position.

These annotations could also be configured in the system to have special functions. For example, special tags could be embedded within the annotations to provide special functionality. Such functionality might include a link to a URL that could be accessed from the user's map. Such a link might provide an advertisement for the establishment, or a promotional offer, or simply be a link to the website for a fixed location. The system implementer might well charge for the use of these special tags, creating a revenue stream from these.

The tags could also be media such as images or video. In that way, a picture, audio cup, or video of the current area or the user describing such could be attached to a sample and viewed by other system users.

In accordance with the various aspects and embodiment of the invention, number of different systems can be configured from the basic premise. For each of these, a number of business cases are possible. In accordance with the various aspects and embodiment of the invention, the system can be implemented as a public system, much like a Waze, providing public access to the system to all enrollees, which might be paid or free subscribers. In such a case, users could connect to the system by downloading an app or connecting to a web-based app and view the created aggregate maps from other users equipped with aft quality instruments and connected to the system. If the user also has an aft quality instrument, that instrument could also be connected to the system via the app to add theft local data to the aggregate system data. Such a system would be available to all subscribers in good standing. With standing to be determined by the system administrators.

In accordance with the various aspects and embodiment of the invention, the system could also be implemented as a private system. It would allow, for example, for an entity to offer such a system distributed across a local area of concern and while making it accessible only to its members. For example, a university could implement such a system on a campus and make such a system available only to faculty and students. As such, annotations could also be used as public service announcements for the campus. The information stream could also be added to existing system to enhance it with aft quality information. Likewise, a corporation could do the same for theft campus, or even within one or more buildings.

In accordance with the various aspects and embodiment of the invention, the system can also be integrated within a facility management system with the data being used as an additional input for aft handling and filtration systems. Thus, the filtration systems could respond to issues that might need to be addressed, but to which the system might otherwise be unaware. For example, alarm levels could be raised if personal air quality instruments worn by staff in a facility exceeded some aggregate alarm level for an area. This might precipitate a response by staff to the areas in question, or it might even be integrated into an automated system to have an automatic response like increasing filtration or aft changes to the areas in question.

In accordance with the various aspects and embodiment of the invention, the system is designed to track sensors that are in motion. This motion allows for a much better resolution with a small number of sensors. Since the sensors are in effect moving through an environment it produces many more data points within that area. It would take a large number of fixed sensors to produce an equivalent survey of the environment. Of course, the sampled data does not persist indefinitely, but producing models from historical data would allow the aging of such data in the absence of new data. This aging of the sensor information could be represented on maps, perhaps by the varying the intensity of the entry, with older stale entries fading away over time.

Another possible feature is that the data combines indoor and outdoor air quality sensors and that the system might determine which of these environments is being measuring based on detailed positional data. So, if position puts a user within a building we would deem the data as originating indoor, or if the position puts the user on a sidewalk moving at a walking pace we could naturally assume that they are outdoors. This would also include assuming that the user is within a vehicle if they are on a freeway moving at 60 mph. Fixed sensors known to be located within buildings might simply always assumed to be indoors. Making this determination would avow the incoming data to be tagged as either indoor or outdoor. Aggregate data sets thus could allow the user to access only indoor or only outdoor data, or might allow them to have both types distinguished within a hybrid map, perhaps with unique symbols for each.

Another strength is that the sensors themselves can be quite disparate and purchased independently by the system users instead of by the entity managing the system. In this way, the system can grow quite quickly as personal aft quality instrumentation becomes commonplace. Traditional monitoring systems are quite limited in scope and size due to the availability of instruments, with the bulk of these in fixed installations, typically capitalized by the system implementer.

When users connect to such a system and connect their aft quality instruments to it, the connection or enrollment process would also identify the aft quality instrument. Part of that identification would provide the specific details for the integrated sensors. This could include the types of sensors, what parameters they measure, their accuracy, resolution, how often they are sampled, what volume of air they sample, etc. This could be done by identifying the sensor as belonging to an air quality instrument already known to the system, or by detailing the details of some instrument by defining a new or custom instrument type, which would allow previously unknown instruments to be added dynamically to the system.

Referring now to FIG. 4, an example of a configuration structure 401, which right be used to describe an air quality instrument, is shown. Of course, much more information could be included like calibration or purchase date, user name identifier, etc. or some of the information could be excluded. The idea is merely that providing a central list of Air Quality Instrument types for users to choose from would eliminate the need for a detailed technical description of these instruments and their capabilities to be made during the enrollment process. Instead the user could simply select from a list of available instruments. However, should the instrument not appear on the list, a mechanism might be available on the server to allow the user to add a new Air Quality Instrument type to the list.

FIG. 4 includes a sample of an Air Quality Instrument data record 411. That record has information on the sample in question 412 which includes the instrument type described above, a unique identifier for this instrument within the system, the date/time of the sample, and the position of the sample. To that is added the air quality instrument sensor information 413 which might include a list of the sensors, their status for that sample and their values for that sample. Finally, an annotation section 414 would avow annotations to be added to that sample, as noted these might include simple Text notation, special tags, or media notations.

In addition to allowing the aggregate display of the air quality over some user selectable geographic area, the application 105,255,355 could also display results from local Air Quality Instrument 101,102,103,201 or Sensor Network 301. This would allow the instrument to operate in local mode in the absence of a network for example on a plane.

The aggregate data displayed by the application 105,255, 305 could well include, as discussed, a geographic map of the local area. For indoor environments like buildings the map could be overlaid within a 3-D representation of the building in question if such were available as might well be the case for private networks. It could perhaps also be rendered automatically using available data for example, from Google Maps both overhead and street view for elevation and from GIS sources and then using position data which has altitude to determine a rough envelope for the building and then estimate the number of floors, etc.

Maps would provide real-time information for the current air quality conditions but they could also provide historical information, where past air quality information would be available, perhaps to look at air quality over some previous period. Such data could be replayed, likely at an accelerated rate, to analyze or review the performance of a building over the course of normal use. It might also be used to analyze propagation of events throughout an area over time, to perhaps then model and provide estimates for air quality events throughout an area based on events in proximity. Though map data is the most obvious usage of such a system there are other display options, including but not limited to, tabular lists, histograms, charts, etc.

The maps themselves might become quite elaborate, allowing all air quality sensors to be displayed concurrently, or allowing only selected air qualify parameters to be displayed. As noted, the sensor data could be aged through an area, perhaps delimiting an area of travel through an environment, like a comet trace with the head being the current position of the sensor and it being the most intense and the tail trailing along behind the head showing the path of travel and with the intensity declining to behind the head eventually to nothing. Perhaps the tail would vary in length and location based on factors like speed of travel, velocity of prevailing winds, etc. This would be useful in sparsely sensed areas, but in more densely sensed areas the display could significantly reduce the area for individual sensors and provide a more heavily aggregated view.

The historical aggregate data could be mined in order to create detailed environmental models or provide specific analyses. Though the data is available in map form for users, access to the aggregate data set could perhaps be sold separately to users interested in such creating an additional revenue stream.

The Server 151,291,391, which could be a single server or a collection of servers located either centrally or distributed, would manage several functions. It would allow users to connect to the system, and manage the administration and creation of user accounts while controlling access. This would include allowing users to configure/attach new sensors to the system. A user might have one or more sensor associated with theft account though users might be able to use the system without having any sensors. The account might be for an individual user, but it might also represent an entity like a corporation or academic institution. The sensors associated with the account would identify themselves through a unique identifier assigned by the server when adding the sensor to the system.

The Server 151,291,391 would receive data from all connected aft quality sensors 411. It would store this data and then periodically aggregate data into a current geographic dataset that would be used by the applications 105,255,355 to represent this aggregated data locally for the user, either in map form or in some other form.

In generating the aggregated current geographic dataset, the Server 151, 291,391 could factor in various parameters in order to create a more accurate model. This might include applying a weight to the value of the sensor data based on the accuracy of particular sensors, aging the sensor data, or factoring in outside information like meteorological sources, or historical or model based data.

The Server 151,291,391 might also identify these sensors as either indoor or outdoor sensors, either from the configuration information defining a sensor as an indoor sensor located in a fixed location and/or from the position information and perhaps velocity and air quality information in comparison with other local sources whether that sensor is at the moment an indoor or outdoor sensor. Such a determination would allow applications 105,255,355 to display one dataset or the other or both, perhaps with some distinction in the representation identifying which type of sensor is represented in the case of a hybrid representation.

Figure 5:
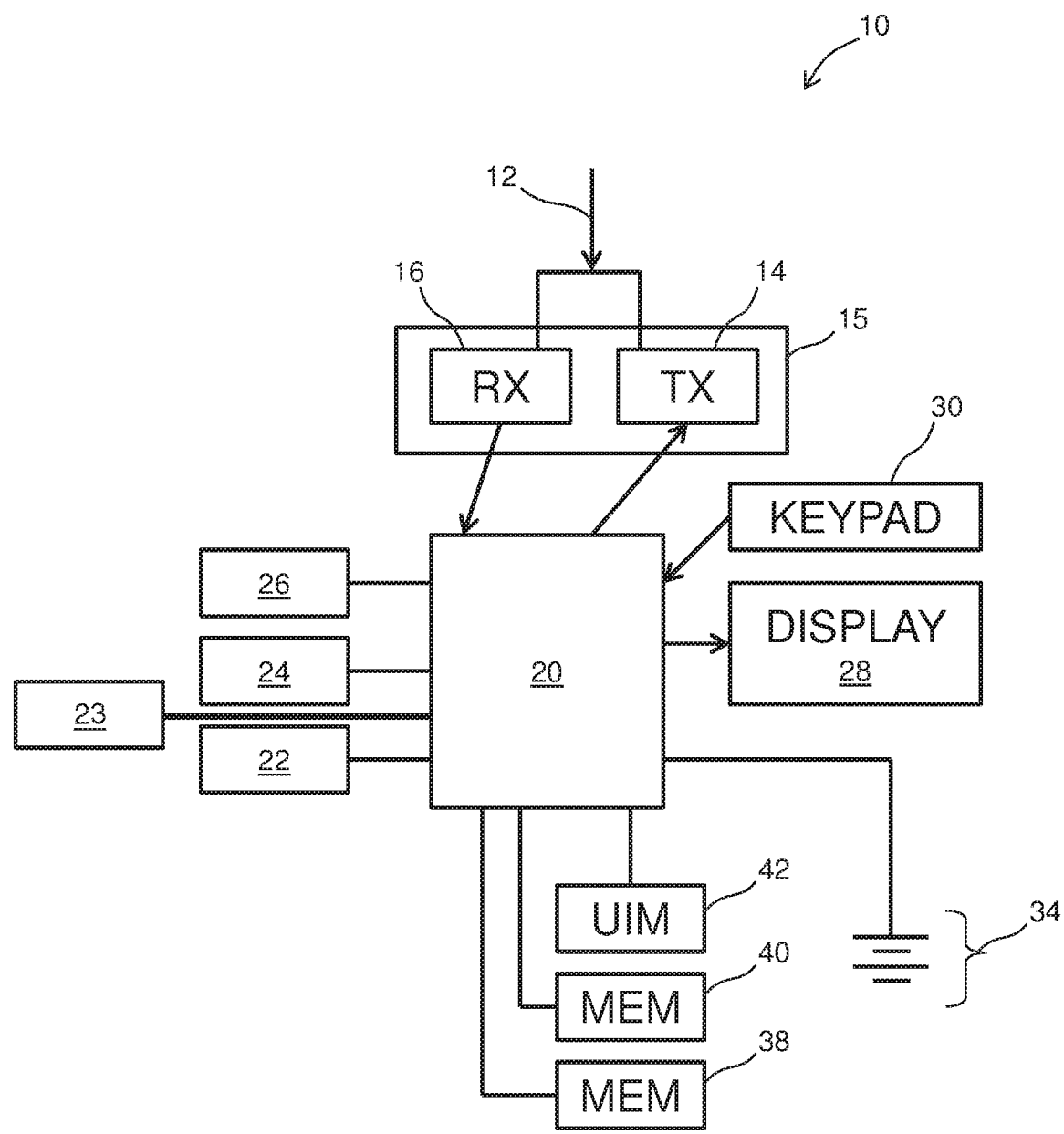
FIG. 5 shows a block diagram of a wireless communication device used in the various aspects and in at least one embodiment of the invention

Referring to FIG. 5, based on the various aspects and embodiments of the invention, illustrates a block diagram of a wireless device 10, such as a mobile telephone or a mobile terminal. It should be understood, however, that the wireless device 10, as illustrated and hereinafter described, is merely illustrative of one type of wireless device and/or mobile device that would benefit from embodiments of the invention and, therefore, should not be taken to limit the scope of embodiments of the invention. While several aspects and embodiments of the wireless and mobile device are illustrated and will be hereinafter described for purposes of example, automobiles, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ aspects and embodiments of the invention.

In addition, while wireless device 10 uses several embodiments of the method of the invention, the method may be employed by other than a wireless device or a mobile terminal. Moreover, the system and method of embodiments of the invention will be primarily described in conjunction with mobile communications applications. It should be understood, however, that the invention could be utilized in conjunction with a variety of other applications, both in the mobile communications industries and outside of the mobile communications industries.

The wireless device 10 includes an antenna 12 (or multiple antennae) in operable connection or communication with a transmitter 14 and a receiver 16 in accordance with one aspect of the invention. In accordance with other aspects of the present invention, the transmitter 14 and the receiver 16 may be part of a transceiver 15. The wireless device 10 may further include an apparatus, such as a controller 20 or other processing element, which provides signals to and receives audio segments from the transmitter 14 and receiver 16, respectively. The signals include signaling information in accordance with the air interface standard of the applicable cellular system, and also user speech, received data and/or user generated data. In this regard, the wireless device 10 is capable of operating with one or more air interface standards, communication protocols, modulation types, and access types.

By way of illustration, the wireless device 10 is capable of operating in accordance with any of a number of first, second, third and/or fourth-generation communication protocols or the like. For example, the wireless device 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous COMA (TD-SCDMA), with fourth-generation (4G) wireless communication protocols or the like. As an alternative (or additionally), the wireless device 10 may be capable of operating in accordance with non-cellular communication mechanisms. For example, the wireless device 10 may be capable of communication in a wireless local area network (WLAN) or other communication networks. The wireless device 10 can also have multiple networking capabilities including nomadic wired tethering, local-area-network transceivers (e.g. IEEE802 Wi-Pi), wide-area-network transceivers (IEEE 802.16 WiMAN/WiMAX, cellular data transceivers, (e.g. LTE) and short-range, data-only wireless protocols such as Ultra-wide-band (UWB), Bluetooth, RFID, Near-field-communications (NFC), etc.

It is understood that the apparatus, such as the controller 20, may include circuitry desirable for implementing audio and logic functions of the wireless device 10. For example, the controller 20 may include a digital signal processor device, a microprocessor device, and various analog to digital converters, digital to analog converters, and other support circuits. Control and signal processing functions of the wireless device 10 are allocated between these devices according to their respective capabilities. The controller 20 may also include the functionality to encode and interleave message and data prior to modulation and transmission. The controller 20 can additionally include an internal voice coder, and may include an internal data modem. Further, the controller 20 may include functionality to operate one or more software programs, which may be stored in memory, such as speech recognition programs. For example, the controller 20 may be capable of operating a connectivity program, such as a conventional Web browser. The connectivity program may then avow the wireless device 10 to transmit and receive Web content, such as location-based content and/or other web page content, according to a Wireless Application Protocol (WAP), Hypertext Transfer Protocol (HTTP) and/or the like, for example.

The wireless device 10 may also comprise a user interface including an output device such as a conventional earphone or speaker 24, a ringer 22, a camera 23, a microphone 26, a display 28, and at least one user input interface, all of which are coupled to the controller 20. The camera 23 allows the user to capture images and display those images on the display 28. The user input interface, which allows the wireless device 10 to receive data, may include any of a number of devices allowing the wireless device 10 to receive data, such as a keypad 30, a touch display (not shown) or another input device. In embodiments including the keypad 30, the keypad 30 may include the conventional numeric (0-9) and related keys (#, *), and other hard and soft keys used for operating the wireless device 10. Alternatively, the keypad 30 may include a conventional QWERTY keypad arrangement. The keypad 30 may also include various soft keys with associated functions. In addition, or alternatively, the wireless device 10 may include an interface device such as a joystick or another user input interface. The wireless device 10 further includes a battery 34, such as a vibrating battery pack, for powering various circuits that are required to operate the wireless device 10, as well as optionally providing mechanical vibration as a detectable output. Alternatively, or in addition, wireless device 10 may include an energy harvester.

The wireless device 10 may further include a user identity module (UIM) 42. The UIM 42 may be a memory device having a processor built in. The UIM 42 may include, for example, a subscriber identity module (SIM), a universal integrated circuit card (UICC), a universal subscriber identity module (USIM), a removable user identity module (R-UIM), etc. The UIM 42 typically stores information elements related to a mobile subscriber. In addition to the UIM 42, the wireless device 10 may be equipped with memory. For example, the wireless device 10 may include volatile memory 40, such as volatile Random Access Memory (RAM) including a cache area for the temporary storage of data, including captured input audio segments. The wireless device 10 may also include other non-volatile memory 38, which can be embedded and/or may be removable. The non-volatile memory 38 can additionally or alternatively comprise an electrically erasable programmable read only memory (EEPROM), flash memory or the like, such as that available from the SanDisk Corporation of Milpitas, Calif., or Micron Consumer Products Group Inc. of Milpitas, Calif. The memories can store any of a number of pieces of information, and data, used by the wireless device 10 to implement the functions of the wireless device 10. For example, the memories can include an identifier, such as an international mobile equipment identification (IMEI) code, capable of uniquely identifying the wireless device 10. Furthermore, the memories may store instructions for determining cell id information. Specifically, the memories may store an application program for execution by the controller 20, which determines an identity of the current cell, i.e., cell id identity or cell id information, with which the wireless device 10 is in communication.

Although not every element of every possible mobile network is shown and described herein, it should be appreciated that the wireless device 10 may be coupled to one or more of any of a number of different networks through a base station (not shown). In this regard, the network(s) may be capable of supporting communication in accordance with any one or more of a number of first-generation (1G), second-generation (2G), 2.5G, third-generation (3G), 3.9G, fourth-generation (4G), fifth-generation (5G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TAOS), network(s) may also benefit from embodiments of the invention, as should dual or higher mode mobile stations (e.g., digital/analog or TDMA/CDMA/analog phones).

The wireless device 10 can further be coupled to one or more wireless access points (APs) (not shown). The APs may comprise access points configured to communicate with the wireless device 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network ('PAN) techniques such as IEEE 802.15, BlueTooth (BT), ultra wideband (UWB) and/or the like. The APs may be coupled to the Internet (not shown). The APs can be directly coupled to the Internet. In accordance with other aspects of the invention, the APs are indirectly coupled to the Internet. Furthermore, in one embodiment, the BS may be considered as another AP.

As will be appreciated, by directly or indirectly connecting the wireless devices 10 to the Internet, the wireless device 10 can communicate with other devices, a computing system, etc., to thereby carry out various functions of the wireless device 10, such as to transmit data, content or the like to, and/or receive content, data or the like from other devices.

As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Unless defined otherwise, all technical and scientific terms used herein have the same meaning as commonly understood by one of ordinary skill in the art to which this invention belongs. Any methods and materials similar or equivalent to those described herein can also be used in the practice of the invention. Representative illustrative methods and materials are also described.

In accordance with the teaching of the invention a computer and a computing device are articles of manufacture. Other examples of an article of manufacture include: an electronic component residing on a mother board, a server, a mainframe computer, or other special purpose computer each including one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention, therefore, is not intended to be limited to the various aspects and embodiments discussed and described herein. Rather, the scope and spirit of the invention is embodied by the appended claims.

What is claimed is:

1. An air quality monitoring system comprising:
a plurality of air quality monitoring instruments, wherein each air quality monitoring instrument comprises a wireless mobile device that includes an air quality sensor with at least one optical particle counter, each wireless mobile device connecting to a public communication network, and wherein at least one air quality monitoring device comprises a drone or a robotic instrument;
at least one server in communication with the plurality of air quality monitoring instruments over the public communication network, the communication including air quality information being delivered to the server from each of the plurality of air quality monitoring instruments, the communication further including control of an operation of at least one of the air quality monitoring instruments using the server;
wherein each of the plurality of air quality monitoring instruments periodically transmits an air quality data record that includes date, time stamp, particle count data and geographic coordinates, through the public communication network to the server;
wherein the air quality data records received from each of the plurality of air quality monitoring instruments are aggregated by the server to create an aggregate data set of air quality over a geographic area, the data record indicating an instrument type to indicate that the at least one air quality monitoring instrument comprises a drone or a robotic instrument; and
wherein the geographic coordinates are detected and updated dynamically without user assistance to automatically generate a current air quality map based on the time stamped data records.

2. The system of claim 1, further comprising a transmitter that transmits aggregated data to at least one user accessing the server with the public communication network.

3. The system in claim 1, wherein the server access and participation is open to a general subscription pool.

4. The system in claim 1, further comprising a controller configured to process the geographic coordinates for the air quality monitoring instruments that are generated by a global positioning system (GPS) sensor or from triangulation of sensors within a local sensor network.

5. The system in claim 1, wherein each wireless mobile device is configured to generate an annotation field within an air quality data record.

6. The system in claim 1, wherein at least one annotation field is attached to the air quality data record and an additional annotation includes a tag tied to a URL that may be accessed by a user.

7. The system in claim 1, where the system communicates with a facility management system through the public communication network.

8. The system in claim 1, wherein the server is configured for access to historical data for at least one of data mining and analysis.

9. The system in claim 1, wherein each wireless mobile device is configured to generate a data record including a field indicating an indoor or outdoor position, at the geographical coordinates and time stamp communicated to the server.

10. The system of claim 1, wherein the data record further comprises a sample rate.

11. The system of claim 1, wherein the data record further comprises a sample volume.

12. The system of claim 1, wherein the data record comprises a parameter type, a parameter accuracy and a parameter range.

13. The system of claim 1, wherein the data record further comprises a temperature and a humidity.

14. The system of claim 1, wherein the data record further comprises a sensor list for the wireless mobile device generating the data record, a sensor type, a sensor status and sensor data.

15. The system of claim 1, further comprising a cloud connected device including a controller running a web based application that processes air quality data, status data, position data, date and time stamp data.

16. The system of claim 1, wherein each wireless mobile device comprises a controller connected to a plurality of sensors including the optical particle counter, power management circuitry to regulate power to the sensors, a transceiver and a battery, wherein the controller, in response to a communication from the server, controls a mode of sensor operation, a diagnostic or a calibration.

17. The system of claim 1, wherein the current air quality map is broadcast using a web based application.

18. The system of claim 1, further comprising a touchscreen display on each wireless mobile device.

19. The system of claim 1, wherein each wireless mobile device comprises an internal data modem.

20. The system of claim 1 wherein at least one wireless mobile device includes a sensor comprising at least one selected from the group including a photometer, a temperature sensor, a relative humidity sensor, and a carbon diode sensor.

* * * * *